United States Patent
Cho et al.

(10) Patent No.: US 7,412,242 B2
(45) Date of Patent: Aug. 12, 2008

(54) APPARATUS AND METHOD FOR CONTROLLING TRANSMISSION POWER IN COMMUNICATION SYSTEMS USING ORTHOGONAL FREQUENCY DIVISION MULTIPLE ACCESS SCHEME

(75) Inventors: Jae-Hee Cho, Seoul (KR); Jae-Ho Jeon, Seongnam-si (KR); Soon-Young Yoon, Seoul (KR); Sang-Hoon Sung, Suwon-si (KR); In-Seok Hwang, Seoul (KR); Hoon Huh, Seongnam-si (KR); Seung-Joo Maeng, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 55 days.

(21) Appl. No.: 11/106,222

(22) Filed: Apr. 14, 2005

(65) Prior Publication Data

US 2006/0234715 A1 Oct. 19, 2006

(30) Foreign Application Priority Data

Apr. 14, 2004 (KR) .................. 10-2004-0025921

(51) Int. Cl.
   *H04Q 7/20* (2006.01)
(52) U.S. Cl. ........................................ 455/447
(58) Field of Classification Search .............. 455/447; 370/342
   See application file for complete search history.

(56) References Cited

U.S. PATENT DOCUMENTS

| 7,069,009 | B2 * | 6/2006 | Li et al. | 455/446 |
| 2002/0061006 | A1 | 5/2002 | Soliman | |
| 2002/0145968 | A1 | 10/2002 | Zhang et al. | |
| 2003/0169681 | A1 * | 9/2003 | Li et al. | 370/203 |

(Continued)

FOREIGN PATENT DOCUMENTS

EP         0 926 844        6/1999

(Continued)

OTHER PUBLICATIONS

Olfat et al., "Low Complexity Adaptive Beamforming and Power Allocation for OFDM Over Wireless Networks", ICC' 99, Jun. 6, 1999, pp. 523-527.

*Primary Examiner*—Duc Nguyen
*Assistant Examiner*—Eric Elcenko
(74) *Attorney, Agent, or Firm*—The Farrell Law Firm, P.C.

(57) ABSTRACT

Disclosed is a method for controlling transmission power to be allocated to sub-carrier signals in a cellular communication system capable of dividing a frequency band into a plurality of sub-carrier bands and multiplexing the sub-carrier signals of the sub-carrier bands based on multiple frequency reuse factors. The method comprises the steps of determining a target Signal to Interference and Noise Ratio (SINR) of sub-carrier signals employing a first frequency reuse factor selected from the multiple frequency reuse factors; determining a weight of the sub-carrier signals employing the first frequency reuse factor and a weight of other sub-carrier signals employing frequency reuse factors other than the first frequency reuse factor corresponding to the target SINR; and applying the determined weights to the sub-carrier signals employing the first frequency reuse factor and the sub-carrier signals employing frequency reuse factors other than the first frequency reuse factor, thereby controlling the transmission power.

9 Claims, 10 Drawing Sheets

U.S. PATENT DOCUMENTS

| | | | |
|---|---|---|---|
| 2004/0202228 A1* | 10/2004 | Kaewell et al. | 375/144 |
| 2004/0228283 A1* | 11/2004 | Naguib et al. | 370/252 |
| 2006/0073802 A1* | 4/2006 | Chari et al. | 455/276.1 |
| 2007/0173277 A1* | 7/2007 | Yun | 455/522 |

FOREIGN PATENT DOCUMENTS

| | | |
|---|---|---|
| EP | 0 986 278 | 3/2000 |
| KR | 1020020011350 | 2/2002 |
| RU | 2 127 948 | 3/1999 |
| RU | 2 142 672 | 12/1999 |
| RU | 2 156 545 | 9/2000 |
| WO | WO 97/49258 | 12/1997 |

* cited by examiner

APPARATUS AND METHOD FOR CONTROLLING TRANSMISSION POWER IN COMMUNICATION SYSTEMS USING ORTHOGONAL FREQUENCY DIVISION MULTIPLE ACCESS SCHEME

PRIORITY

This application claims the benefit under 35 U.S.C. 119 of an application entitled "Apparatus And Method For Controlling Transmission Power In Communication Systems Using Orthogonal Frequency Division Multiple Access Scheme" filed in the Korean Intellectual Property Office on Apr. 14, 2004 and assigned Serial No. 2004-25921, the entire contents of which are incorporated herein by reference.

BACKGROUND OF THE INVENTION

1. Field of the Invention

The present invention relates to a cellular communication system, and more particularly, to an apparatus and a method for controlling transmission power in an Orthogonal Frequency Division Multiple Access (OFDMA) cellular communication system using a multiple frequency reuse factor.

2. Description of the Related Art

Recent developments in wireless networks focus on a $4^{th}$ Generation (4G) communication systems that provides superior Quality of Service (QoS) at a higher transmission rate. In particular, the focus is on providing subscribers with high speed services by ensuring mobility and QoS to wireless Local Area Network (LAN) communication systems and wireless Metropolitan Area Network (MAN) communication systems, which network topologies that can provide services at a relatively high transmission rate.

To support broadband transmission networks for a physical channel of the wireless MAN communication system, the Institute of Electrical and Electronics Engineers (IEEE) has suggested using an Orthogonal Frequency Division Multiplexing (OFDM) scheme and an OFDMA scheme with an IEEE 802.16a communication system. According to the IEEE 802.16a communication system, the OFDM/OFDMA schemes are applied to the wireless MAN system to transmit a physical channel signal at a high transmission rate by using a plurality of sub-carriers.

The IEEE 802.16a communication system is based on a single cell structure without taking mobility of a Subscriber Station (SS) into consideration. In contrast, an IEEE 802.16e communication system does take mobility of the SS into consideration while still incorporating the features of the IEEE 802.16a communication system.

The IEEE 802.16e communication system reflects the mobility of the SS under a multi-cell environment. To provide mobility to the SS under the multi-cell environment, the operational relationship between the SS and a Base Station (BS) must be changed. To that end, research focuses on SS handover. A mobile SS is referred to as a Mobile Subscriber Station (MSS).

Hereinafter, a conventional IEEE 802.16e communication system will be described with reference to FIG. 1.

FIG. 1 is a schematic view illustrating the structure of a conventional IEEE 802.16e communication system.

Referring to FIG. 1, the conventional IEEE 802.16e communication system has a multi-cell structure including a cell 100 and a cell 150. The conventional IEEE 802.16e communication system includes a BS 110 for managing the cell 100, a BS 140 for managing the cell 150, and a plurality of MSSs 111, 113, 130, 151 and 153. The BSs 110 and 140 communicate with the MSSs 111, 113, 130, 151 and 153 through the OFDM/OFDMA schemes.

The conventional IEEE 802.16e communication system performs an Inverse Fast Fourier Transform (IFFT) and uses 1702 sub-carriers. Among the 1702 sub-carriers, 166 sub-carriers are used as pilot sub-carriers and 1536 sub-carriers are used as data sub-carriers. In addition, the 1536 sub-carriers are divided into 32 sub-channels, each including 48 sub-carriers. The sub-channels are allocated to the MSSs according to the state of the system. Herein, the sub-channel is a channel with at least one sub-carrier. For instance, 48 sub-carriers may form one sub-channel.

As mentioned above, when the sub-channels are formed in the IEEE 802.16e communication system, the total sub-channels are divided into several groups and mutually different frequency reuse factors are applied to each group. Hereinafter, a method of allocating frequency resources based on multiple frequency reuse factors in the conventional IEEE 802.16e communication system will be described with reference to FIG. 2.

FIG. 2 is a schematic view illustrating a frequency resource allocation operation based on multiple frequency reuse factors in the conventional IEEE 802.16e cellular communication system.

Referring to FIG. 2, a cell center region 200 adjacent to a BS has a relatively high signal to interference and noise ratio (SINR), so a frequency resource with a frequency reuse factor of 1 is allocated to an MSS located in the cell center region 200. In contrast, a cell boundary region 250, which is relatively remote from the BS, has a relatively low SINR, so a frequency resource with a frequency reuse factor greater than 1 (K>1) is allocated to the MSS located in the cell boundary region 250. By allocating the frequency resources to the MSSs with mutually different frequency reuse factors, limited frequency resources are used more effectively and efficiently.

Hereinafter, a method for creating the sub-channels based on the multiple frequency reuse factors in the conventional IEEE 802.16e communication system will be described with reference to FIG. 3.

FIG. 3 is a schematic view illustrating a procedure of creating the sub-channels based on multiple frequency reuse factors in the conventional IEEE 802.16e communication system.

Referring to FIG. 3, if the IEEE 802.16e communication system uses N sub-carriers, the N sub-carriers are divided into G groups. Each of the G groups consists of S sub-carriers, so that the following equation is satisfied.

$$N = S \times G.$$

A first sub-channel is created by selecting one sub-carrier from each of the G groups. A second sub-channel is created by selecting one sub-carrier from each of the G groups, except for the sub-carrier allocated to the first sub-channel. The above procedure may be repeated until all sub-carriers of the G groups are allocated to the sub-channels. As a result, a set of S sub-channels is created.

It is also possible to create a new set of S sub-channels having sub-carriers different from the above sub-carriers by varying the sub-carrier selection scheme. The number of sets of the S sub-channels including mutually different sub-carriers is $(S!)^G$. Herein, a combination of the sub-carriers forming the sub-channel will be referred to as a "sub-carrier combination".

In the following description, a set of $n^{th}$ sub-channels selected from among the $(S!)^G$ sets of the S sub-channels is defined as $A_n$ and an $m^{th}$ sub-channel of the sub-channel set $A_n$ is defined as $SC_m^n$. Herein, $n=[0, (S!)^G]$, and $m=[0, S-1]$. S sub-channels ($SC_m^n$ and $SC_l^n$) forming the same sub-channel set $A_n$ are orthogonal to each other. So, the sub-carriers forming each of the S sub-channels may not collide with each other. In addition, the sub-channels ($SC_m^n$ and $SC_l^k$, $n \neq k$) forming mutually different sets of the sub-channels are aligned without ensuring orthogonality therebetween; the sub-carriers forming mutually different sub-channels may collide with each other.

In addition, C sub-channel sets $A_n$ are selected from among the $(S!)^G$ sets of the S sub-channels. At this time, if a predetermined sub-channel is selected from each of the C sub-channel sets $A_n$, the number of sub-carriers having the collision characteristics can be uniform. As a result, the total number of sub-carriers with collision characteristics between two sub-channel sets is proportional to the number of sub-channels; the sub-channel set is created by selecting sub-carriers from among the $(S!)^G$ sets of the S sub-channels. The C sub-channel sets with mutually different sub-carrier combinations, and the sub-carriers with uniform collision characteristics can be created through various schemes.

Hereinafter, a method of managing the sub-channel with a frequency reuse factor of 1 in the IEEE 802.16e communication system will be described.

First, when the frequency reuse factor is 1, all sub-carriers in a predetermined cell of the IEEE 802.16e communication system (that is, all sub-channels) can be used in adjacent cells. If each the cells uses a sub-channel set having the same sub-carrier combination (that is, if each cell uses the same $A_n$), interference variation may occur in each sub-channel of the sub-channel set depending on the channel states. Therefore, when presently measured channel information is applied to a next time duration, it is impossible to predict the channel state.

Hereinafter, a method of creating the sub-channel when the frequency reuse factor is 1 in the IEEE 802.16e communication system will be described with reference to FIGS. 4A and 4B.

FIG. 4A is a schematic view illustrating a procedure of creating the sub-channel when the frequency reuse factor is 1 in the conventional IEEE 802.16e communication system.

Referring to FIG. 4A, if the IEEE 802.16e communication system uses N sub-carriers, C sub-channel sets An can be created from the N sub-carriers through various sub-carrier selection schemes.

FIG. 4B is a schematic view illustrating a sub-channel set corresponding to FIG. 4A allocated to cells forming the IEEE 802.16e communication system.

Referring to FIG. 4B, the C sub-channel sets An are allocated to the cells of the IEEE 802.16e communication system. Each sub-channel of the C sub-channel sets $A_n$ is orthogonal to the other sub-channels in the same sub-channel set while representing the uniform collision characteristics with respect to the sub-channels of different sub-channel sets.

If the C sub-channel sets $A_n$ are allocated to each cell, the interference component from the adjacent cells can be averaged due to the uniform collision characteristics of the sub-carriers. So, if the amount of resources used in the adjacent cells is not changed, the validity of channel state information measured in a predetermined time unit can be maintained. In this manner, the IEEE 802.16e communication system can effectively manage the sub-channel based on the frequency reuse factor of 1. And although the inter-cell interference can be averaged, the SINR may be reduced from the interference components of adjacent cells. In particular, the SINR of the cell boundary region is significantly reduced.

Error correction coding with very low rate and modulation schemes with lower modulation order can be applied to the MSS located in the cell boundary region to ensure service coverage of the wireless cellular communication system. However, such error correction coding may degrade bandwidth efficiency, thereby significantly lowering the transmission rate for the MSS in the cell boundary region.

The IEEE 802.16e communication system with the frequency reuse factor K uses K unique frequency bands. Alternatively, the system logically divides the sub-carriers included in one frequency band into K sub-carrier groups. In accordance with an embodiment of the present invention, the sub-carriers included in one frequency band are divided into K sub-carrier groups and the frequency reuse factor K is managed based on the K sub-carrier groups.

Hereinafter, a procedure of creating the sub-channel in the IEEE 802.16e communication system based on the frequency reuse factor K will be described with reference to FIGS. 5A and 5B.

FIG. 5A is a schematic view illustrating the procedure of creating the sub-carrier in the IEEE 802.16e communication system based on the frequency reuse factor of K.

Referring to FIG. 5A, the sub-carriers formed in one frequency band are divided into K sub-carrier groups and the frequency reuse factor K is managed based on the K sub-carrier groups. In FIG. 5A, the frequency reuse factor is 3 (K=3). S sub-channels forming a predetermined sub-channel set $A_n$ are divided into three exclusive sub-channel groups defined as $A_n^\alpha$, $A_n^\beta$, and $A_n^\gamma$.

FIG. 5B is a schematic view illustrating a group of sub-carriers corresponding to FIG. 5A allocated to sectors forming the cell of the IEEE 802.16e communication system.

Referring to FIG. 5B, under the frequency reuse factor of 3, three sub-channel groups $A_n^\alpha$, $A_n^\beta$, and $A_n^\gamma$ are allocated to equal sectors of each cell. In an ideal case, inter-cell/sector interference rarely occurs so that the average transmission rate of the MSS located in the boundary region of the cell or sector may increase. However, the resources allocated to each cell or sector is reduced to ⅓, so the capacity of the cell or sector is reduced.

Hereinafter, a method of employing the frequency reuse factors 1 and K for improving bandwidth efficiency and system capacity of the IEEE 802.16e communication system will be described.

As described above with reference to FIG. 2, if the MSSs are located adjacent to the BS, relatively weak interference is applied to the MSSs in the cell center region. The MSSs in the cell center region may operate based on the frequency reuse factor of 1. In contrast, the MSSs located in the cell boundary region may operate with K>1 to reduce the interference applied to the MSSs from the adjacent cell or sector. That is, when simultaneously employing the frequency reuse factors 1 and K in the same cell, the interference in the boundary region of the cell/sector can be reduced by employing the frequency reuse factor 1 and the system capacity of the BS can be improved by employing the frequency reuse factor K.

However, if the IEEE 802.16e communication system employs the frequency reuse factors 1 and K without physically discriminating them, a relatively large interference component results. As a result, the SINR of the MSS having the frequency reuse factor K may be reduced and performance thereof will be significantly degraded. To solve the above problem, orthogonality is ensured between frequency resources having mutually different frequency reuse factors.

Hereinafter, a procedure of allocating frequency resources based on multiple frequency reuse factors in the IEEE 802.16e communication system will be described with reference to FIG. 6.

FIG. 6 is a schematic view illustrating the procedure of allocating the frequency resources based on multiple frequency reuse factors in the IEEE 802.16e communication system.

Referring to FIG. 6, if the IEEE 802.16e communication system uses N sub-carriers, the N sub-carriers are divided into G groups. Herein, each of the G groups consists of S sub-carriers, so that the following equation is satisfied:

$$N=S \times G$$

In addition, each of the G groups is divided into two sub-groups. The sub-groups include $S_1$ sub-carriers and $S_k$ sub-carriers, respectively.

First, a first sub-channel is created by selecting one sub-carrier from each of the G sub-groups. A second sub-channel is created by selecting one sub-carrier from each of the G sub-groups except for the sub-carrier that is already allocated to the first sub-channel. The above procedure may be repeated until all sub-carriers of the G sub-groups are allocated to the sub-channels. As a result, a set of $S_1$ sub-channels is created. In addition, as mentioned above, it is also possible to create a new set $A_n$ of C sub-channels having sub-carriers different from the above sub-carriers by varying the sub-carrier selection scheme. The sub-channels of the new set $A_n$ are orthogonal to each other in the same sub-channel set while representing the uniform collision characteristics with respect to sub-channels in the other sub-channel set. The sub-channel set $A_n$ is allocated to each cell/sector so that the cell/sector can be managed with a frequency reuse factor of 1.

Next, a first sub-channel is created by selecting one sub-carrier from each of the G sub-groups including $S_k$ sub-carriers. A third sub-channel is created by selecting one sub-carrier from each of the G sub-groups except for the sub-carrier already allocated to the first sub-channel. The above procedure may be repeated until all sub-carriers of the G sub-groups are allocated to the sub-channels. As a result, a set of $S_k$ sub-channels is created. The sub-channels are divided into K exclusive sub-channel groups and allocated to each of K cells/sectors, so that the cells/sectors can be managed with a frequency reuse factor K. In particular, since the sub-channels employing the frequency reuse factor 1 and sub-channels employing the frequency factor K include mutually different sub-carriers, interference may be prevented even if the frequency reuse factors of 1 and K are simultaneously employed.

However, there is no apparatus or method for controlling transmission power in the IEEE 802.16e communication system employing multiple frequency reuse factors.

SUMMARY OF THE INVENTION

Accordingly, the present invention has been made to solve the above-mentioned problems occurring in the prior art, and an object of the present invention is to provide an apparatus and a method for controlling transmission power in an OFDMA cellular communication system using multiple frequency reuse factors.

Another object of the present invention is to provide an apparatus and a method capable of obtaining various signal to interference ratios (SINRs) according to frequency reuse factors in an OFDMA cellular communication system using multiple frequency reuse factors.

To accomplish these objects, according to a first aspect of the present invention, there is provided a method for controlling transmission power to be allocated to sub-carrier signals in a cellular communication system capable of dividing a frequency band into a plurality of sub-carrier bands and multiplexing the sub-carrier signals of the sub-carrier bands based on multiple frequency reuse factors. The method comprises the steps of determining a target Signal to Interference and Noise Ratio (SINR) of sub-carrier signals employing a first frequency reuse factor selected from the multiple frequency reuse factors; determining a weight of the sub-carrier signals employing the first frequency reuse factor and a weight of other sub-carrier signals employing frequency reuse factors other than the first frequency reuse factor corresponding to the target SINR; and applying the determined weights to the sub-carrier signals employing the first frequency reuse factor and the sub-carrier signals employing frequency reuse factors other than the first frequency reuse factor, thereby controlling the transmission power.

According to a second aspect of the present invention, there is provided a method for controlling transmission power to be allocated to sub-carrier signals in a cellular communication system capable of dividing a frequency band into a plurality of sub-carrier bands and multiplexing the sub-carrier signals of the sub-carrier bands based on frequency reuse factors of 1 and K. The method comprises the steps of determining a target Signal to Interference and Noise Ratio (SINR) of sub-carrier signals employing the frequency reuse factor of K; determining weights of the sub-carrier signals employing the frequency reuse factors of 1 and K corresponding to the target SINR, respectively; and applying the determined weights to the sub-carrier signals employing the frequency reuse factors of 1 and K, thereby controlling the transmission power.

According to a third aspect of the present invention, there is provided a method for controlling transmission power to be allocated to sub-carrier signals in a cellular communication system capable of dividing a frequency band into a plurality of sub-carrier bands and multiplexing the sub-carrier signals of the sub-carrier bands based on frequency reuse factors of 1 and K. The method comprises the steps of determining an improvement value of a Signal to Interference and Noise Ratio (SINR) of sub-carrier signals employing the frequency reuse factor of K to increase the SINR of the sub-carrier signals employing the frequency reuse factor of K obtained in a previous time duration; determining weights of the sub-carrier signals employing the frequency reuse factors of 1 and K corresponding to the improvement value of the SINR, respectively; and applying the determined weights to the sub-carrier signals employing the frequency reuse factors of 1 and K, thereby controlling the transmission power.

According to a fourth aspect of the present invention, there is provided a method for controlling transmission power to be allocated to sub-carrier signals in a cellular communication system capable of dividing a frequency band into a plurality of sub-carrier bands, dividing the sub-carrier signals of the sub-carrier bands into data sub-carrier signals for transferring data signals and reference signal sub-carrier signals for transferring predetermined reference signals and multiplexing the sub-carrier signals of the sub-carrier bands based on frequency reuse factors of 1 and K. The method comprises the steps of determining a target Signal to Interference and Noise Ratio (SINR) of the data sub-carrier signals employing the frequency reuse factor of K; determining weights of the data sub-carrier signals and pilot sub-carrier signals employing the frequency reuse factors of 1 and K corresponding to the target SINR, respectively; and applying the determined weights to the data sub-carrier signals and pilot sub-carrier signals employing the frequency reuse factors of 1 and K, thereby controlling the transmission power.

According to a fifth aspect of the present invention, there is provided an apparatus for controlling transmission power to be allocated to sub-carrier signals in a cellular communication system capable of dividing a frequency band into a plurality of sub-carrier bands and multiplexing the sub-carrier signals of the sub-carrier bands based on multiple frequency reuse factors. The apparatus comprises a transmission power allocator for determining a target Signal to Interference and Noise Ratio (SINR) of sub-carrier signals employing a first frequency reuse factor selected from the multiple frequency reuse factors, determining a weight of the sub-carrier signals employing the first frequency reuse factor and a weight of other sub-carrier signals employing frequency reuse factors other than the first frequency reuse factor corresponding to the target SINR, and applying the determined weights to the sub-carrier signals employing the first frequency reuse factor and the sub-carrier signals employing frequency reuse factors other than the first frequency reuse factor, thereby controlling the transmission power.

According to a sixth aspect of the present invention, there is provided an apparatus for controlling transmission power to be allocated to sub-carrier signals in a cellular communication system capable of dividing a frequency band into a plurality of sub-carrier bands and multiplexing the sub-carrier signals of the sub-carrier bands based on frequency reuse factors of 1 and K. The apparatus comprises a transmission power allocator for determining a target Signal to Interference and Noise Ratio (SINR) of sub-carrier signals employing frequency reuse factor of K, determining weights of the sub-carrier signals employing the frequency reuse factors of 1 and K corresponding to the target SINR, and applying the determined weights to the sub-carrier signals employing the frequency reuse factors of 1 and K, thereby controlling the transmission power.

According to a seventh aspect of the present invention, there is provided an apparatus for controlling transmission power to be allocated to sub-carrier signals in a cellular communication system capable of dividing a whole frequency band into a plurality of sub-carrier bands and multiplexing the sub-carrier signals of the sub-carrier bands based on frequency reuse factors of 1 and K. The apparatus comprises a transmission power allocator for determining an improvement value of a Signal to Interference and Noise Ratio (SINR) of sub-carrier signals employing the frequency reuse factor of K to increase the SINR of the sub-carrier signals employing the frequency reuse factor of K obtained in a previous time duration, determining weights of the sub-carrier signals employing the frequency reuse factors of 1 and K corresponding to the improvement value of the SINR, and applying the determined weights to the sub-carrier signals employing the frequency reuse factors of 1 and K, thereby controlling the transmission power.

According to an eighth aspect of the present invention, there is provided an apparatus for controlling transmission power to be allocated to sub-carrier signals in a cellular communication system capable of dividing a frequency band into a plurality of sub-carrier bands, dividing the sub-carrier signals of the sub-carrier bands into data sub-carrier signals for transferring data signals and reference signal sub-carrier signals for transferring predetermined reference signals and multiplexing the sub-carrier signals of the sub-carrier bands based on frequency reuse factors of 1 and K. The apparatus comprises a transmission power allocator for determining a target Signal to Interference and Noise Ratio (SINR) of the data sub-carrier signals employing the frequency reuse factor of K, determining weights of the data sub-carrier signals and pilot sub-carrier signals employing the frequency reuse factors of 1 and K corresponding to the target SINR, and applying the determined weights to the data sub-carrier signals and pilot sub-carrier signals employing the frequency reuse factors of 1 and K, respectively, thereby controlling the transmission power.

According to a ninth aspect of the present invention, there is provided a method for controlling transmission power in a cellular communication system. The method comprising the steps of: dividing sub-carriers of the cellular communication system into at least two groups; and applying mutually different frequency reuse factors to the groups and allocating mutually different transmission power to the groups employing mutually different frequency reuse factors.

According to a tenth aspect of the present invention, there is provided an apparatus for controlling transmission power in a cellular communication system. The apparatus comprises a transmission power allocator for applying mutually different frequency reuse factors to sub-carriers of the cellular communication system, which are divided into at least two groups, in such a manner that each of two groups employs mutually different frequency reuse factors.

According to an eleventh aspect of the present invention, there is provided a method for controlling transmission power to be allocated to sub-carrier signals in a cellular communication system capable of dividing a frequency band into a plurality of sub-carrier bands and multiplexing the sub-carrier signals of the sub-carrier bands based on at least two frequency reuse factors. The method comprises the steps of: determining the transmission power to be applied to the sub-carrier signals employing mutually different frequency reuse factors; and applying the determined transmission power to the sub-carrier signals employing mutually different frequency reuse factors and transmitting the sub-carrier signals.

According to a twelfth aspect of the present invention, there is provided an apparatus for controlling transmission power to be allocated to sub-carrier signals in a cellular communication system capable of dividing a frequency band into a plurality of sub-carrier bands and multiplexing the sub-carrier signals of the sub-carrier bands based on at least two frequency reuse factors. The apparatus comprises a controller for determining the transmission power to be applied to the sub-carrier signals employing mutually different frequency reuse factors; and a transmission power allocator for applying the determined transmission power to the sub-carrier signals employing mutually different frequency reuse factors to transmit the sub-carrier signals.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Hereinafter, embodiments of the present invention will be described with reference to the accompanying drawings. In the following detailed description, a detailed description of known functions and configurations incorporated herein will be omitted when it may make the subject matter of the present invention unclear.

The present invention provides a cellular communication system. More particularly, the present invention provides an apparatus and a method for controlling transmission power in an Institute of Electrical and Electronics Engineers (IEEE) 802.16e communication system, which is a cellular communication system using an Orthogonal Frequency Division Multiple Access (OFDMA) scheme using a multiple frequency reuse factors. Although the present invention will be described in relation to the IEEE 802.16e communication system for illustrative purpose, the apparatus and the method of the present invention may be applicable to other cellular communication systems with multiple frequency reuse factors.

Hereinafter, structure of a transmitter for an IEEE 802.16e communication system according to an embodiment of the present invention will be described with reference to FIG. 7, which is a schematic view illustrating the structure of such a transmitter.

Figure 1:
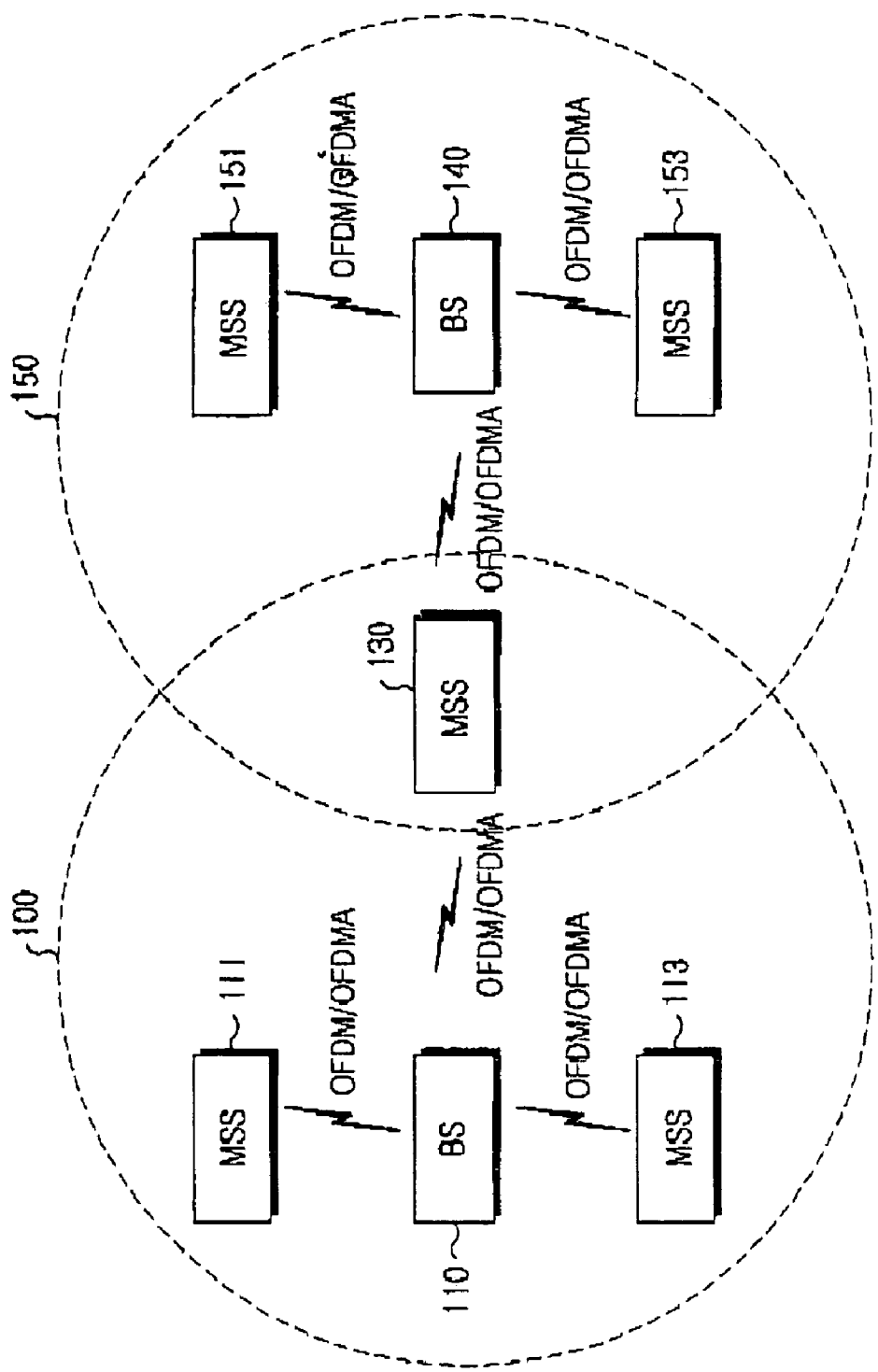
FIG. 1 is a schematic view illustrating a structure of a conventional IEEE 802.16e communication system.
Figure 2:
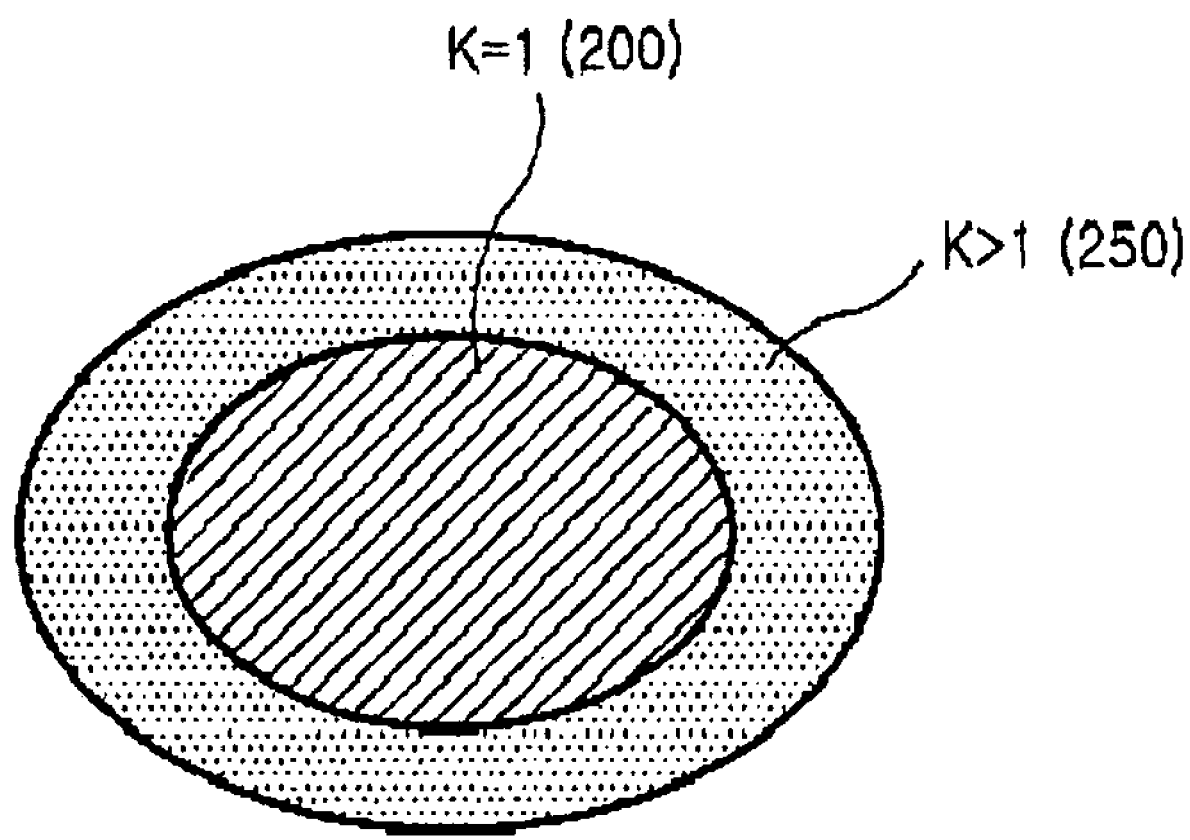
FIG. 2 is a schematic view illustrating frequency resource allocation in a conventional IEEE 802.16e communication system based on multiple frequency reuse factors.
Figure 3:
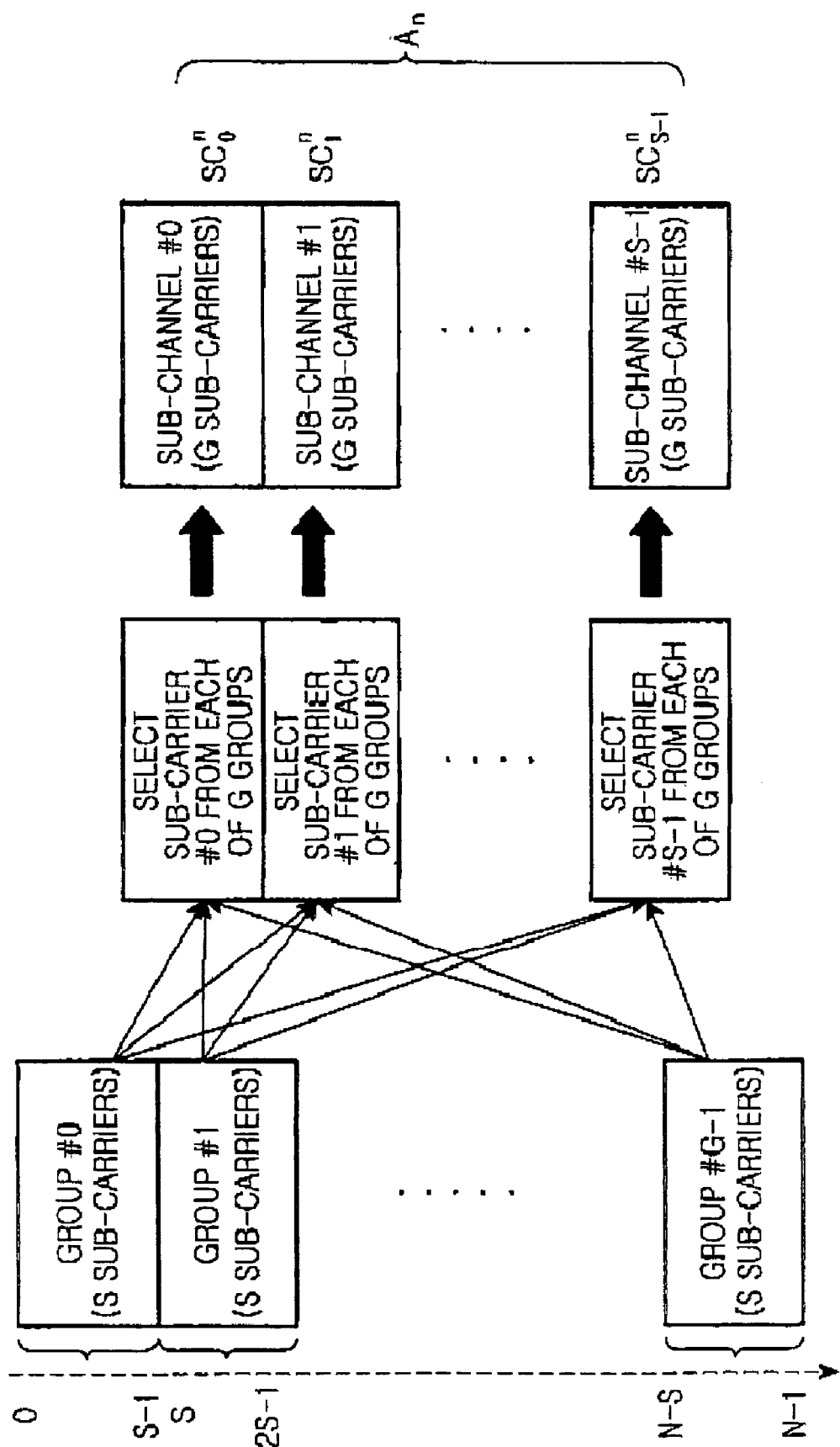
FIG. 3 is a schematic view illustrating a procedure of creating sub-channels in a conventional IEEE 802.16e communication system.
Figure 4A:
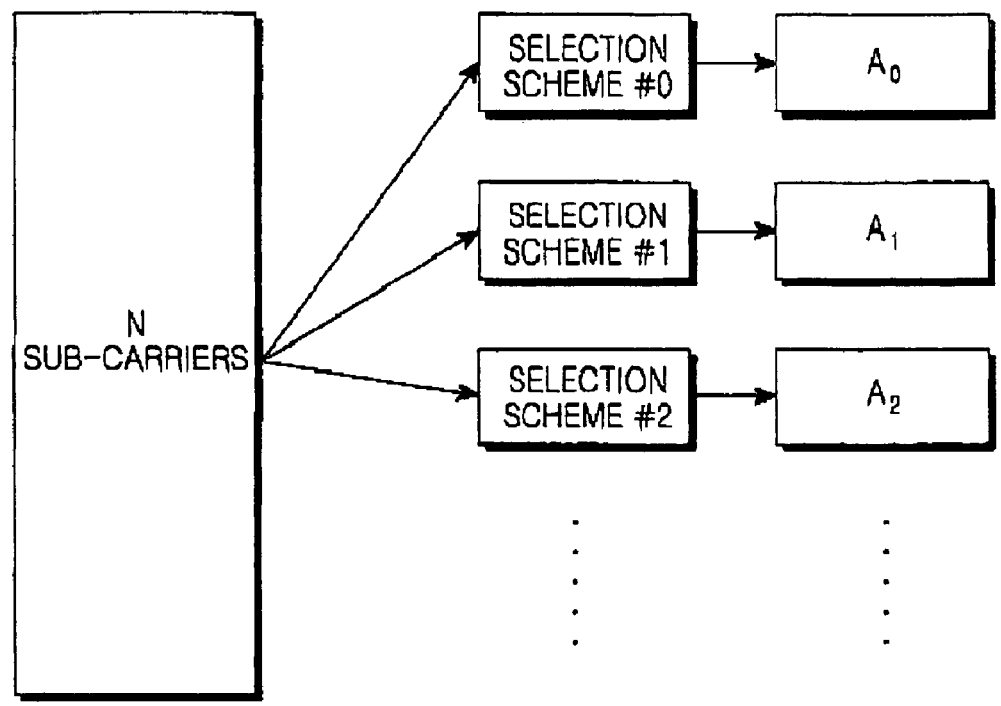
FIG. 4A is a schematic view illustrating a procedure of creating a sub-channel in a conventional IEEE 802.16e communication system based on a frequency reuse factor of 1.
Figure 4B:
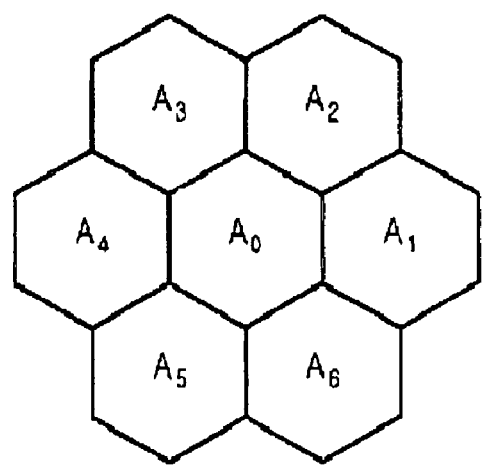
FIG. 4B is a schematic view illustrating a set of sub-channels corresponding to FIG. 4A allocated to cells forming a conventional IEEE 802.16e communication system.
Figure 5A:
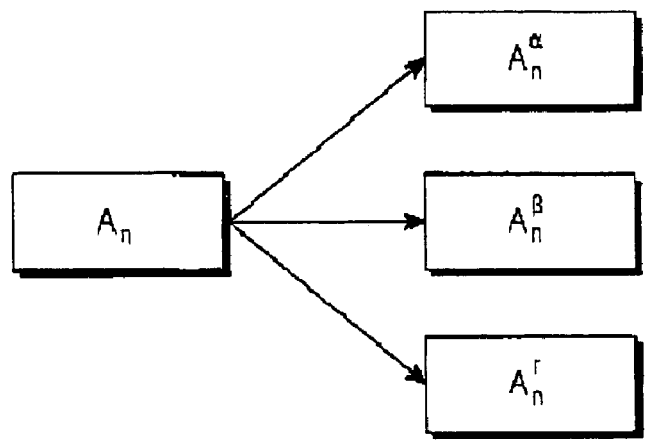
FIG. 5A is a schematic view illustrating a procedure of creating a sub-channel in a conventional IEEE 802.16e communication system based on a frequency reuse factor K.
Figure 5B:
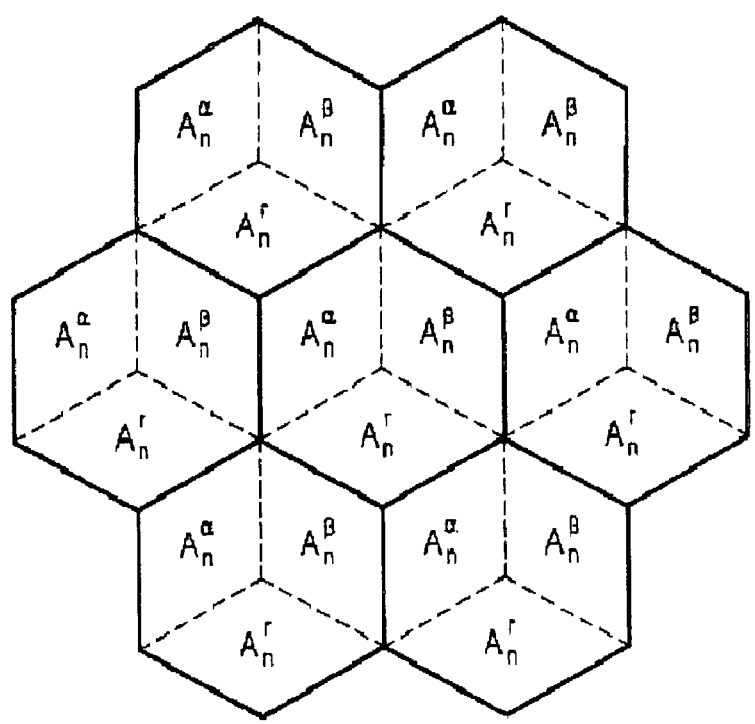
FIG. 5B is a schematic view illustrating a group of sub-channels corresponding to FIG. 5A allocated to sectors forming a cell of a conventional IEEE 802.16e communication system.
Figure 6:
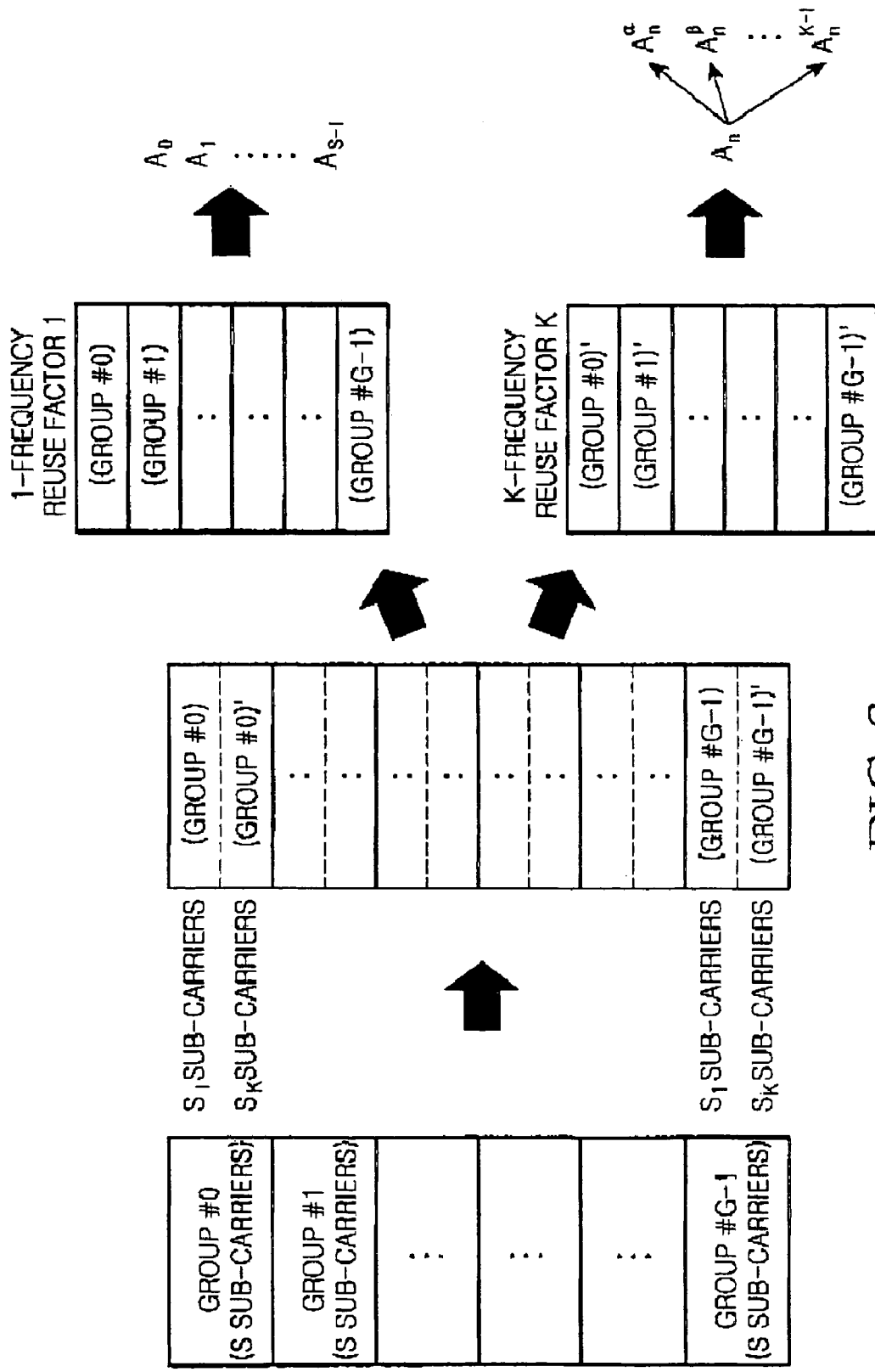
FIG. 6 is a schematic view illustrating a procedure of allocating frequency resources based on multiple frequency reuse factors in a conventional IEEE 802.16e communication system.
Figure 7:
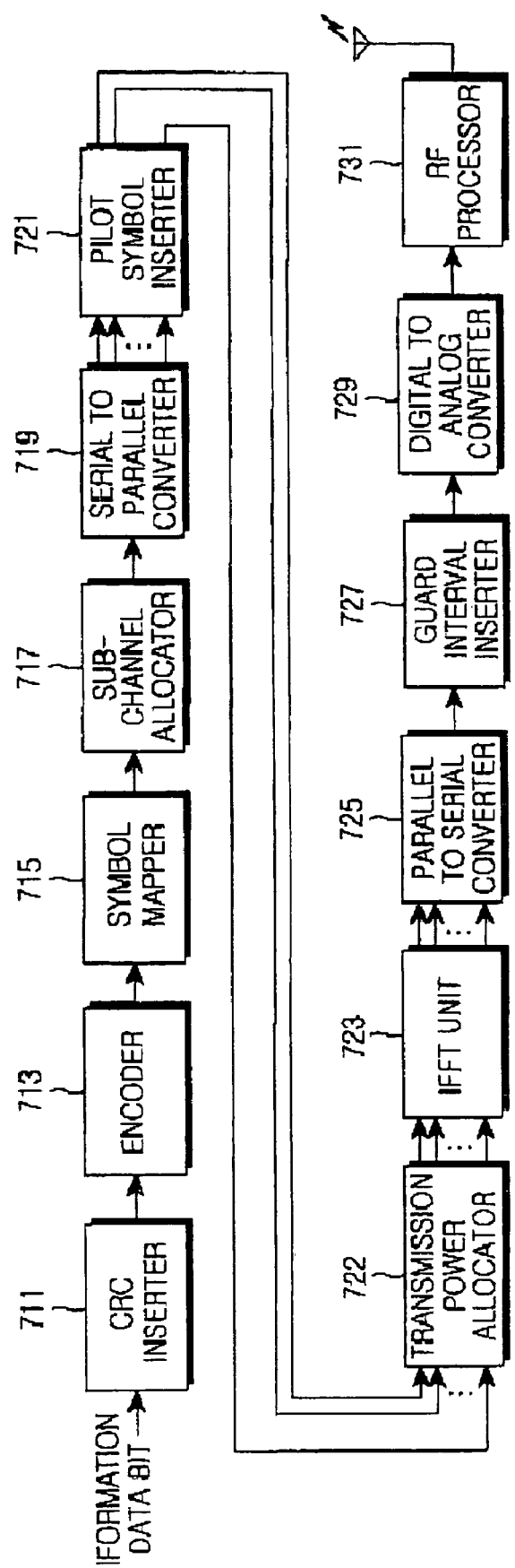
FIG. 7 is a schematic view illustrating a structure of a transmitter used in an IEEE 802.16e communication system according to an embodiment of the present invention.

Referring to FIG. 7, the transmitter includes a cyclic redundancy check (CRC) inserter 711, an encoder 713, a symbol mapper 715, a sub-channel allocator 717, a serial to parallel converter 719, a pilot symbol inserter 721, a transmission power allocator 722, an Inverse Fast Fourier Transform (IFFT) unit 723, a parallel to serial converter 725, a guard interval inserter 727, a digital to analog converter 729, and a radio frequency (RF) processor 731.

When user data bits and control data bits are generated, the user data bits and control data bits are input to the CRC inserter 711. The user data bits and control data bits are referred to herein as "information data bits". The CRC inserter 711 inserts a CRC bit into the information data bits and outputs the information data bits to the encoder 713. Upon receiving the signal from the CRC inserter 711, the encoder 713 codes the signal through a predetermined coding scheme and outputs the coded signal to the symbol mapper 715. In this example, the predetermined coding scheme includes a turbo coding scheme having a predetermined coding rate or a convolutional coding scheme.

The symbol mapper 715 modulates the coded bits output from the encoder 713 through a predetermined modulation scheme, forming a modulation symbol. The modulation symbol is output to the sub-channel allocator 717. In this example, the predetermined modulation scheme includes a quadrature phase shift keying (QPSK) scheme or a sixteen (16) quadrature amplitude modulation (QAM) scheme. Upon receiving the modulation symbols from the symbol mapper 715, the sub-channel allocator 717 allocates the sub-channels to the modulation symbols and outputs the modulation symbols to the serial to parallel converter 719. As mentioned above, the sub-channel allocator 717 allocates the sub-channels by applying mutually different frequency reuse factors. That is, the allocator 717 allocates the sub-channels to the modulation symbols by applying frequency reuse factors of 1 and K.

Upon receiving the serial modulation symbols with the sub-channels from the sub-channel allocator 717, the serial to parallel converter 719 parallel-converts the modulation symbols and outputs the modulation symbols to the pilot symbol inserter 721. The pilot symbol inserter 721 inserts pilot symbols into the parallel modulation symbols and outputs the parallel modulation symbols to the transmission power allocator 722.

The transmission power allocator 722 allocates transmission power to the sub-channels according to frequency reuse factors thereof and outputs the sub-channels to the IFFT unit 723. That is, the transmission power allocator 722 allocates transmission power to a sub-carrier signal having a pilot symbol (hereinafter, referred to as a pilot sub-carrier signal) and a sub-carrier signal having data (hereinafter, referred to as a data sub-carrier signal) and transmits the pilot sub-carrier signal and the data sub-carrier signal to the IFFT unit 723. Transmission power allocation of the transmission power allocator 722 will be described later in detail.

The IFFT unit 723 performs an N-point IFFT on the signals from the transmission power allocator 722, and sends the signals to the parallel to serial converter 725. The parallel to serial converter 725 converts the parallel signals into serial signals and outputs the serial signals to the guard interval inserter 727. The guard interval inserter 727 inserts a guard interval signal into the serial signals and outputs the serial signals to the digital to analog converter 729. Herein, the guard interval is used for removing interference between previous Orthogonal Frequency Division Multiplexing (OFDM) symbols and current OFDM symbols when the OFDM symbols are transmitted in the OFDMA communication system. In addition, the guard interval can be inserted into the OFDM symbol through a cyclic prefix scheme, in which predetermined final samples of the OFDM symbols in a time domain are copied and the copied samples are inserted into effective OFDM symbols, or through a cyclic postfix scheme, in which predetermined fore-samples of the OFDM symbols in the time domain are copied and the copied samples are inserted into effective OFDM symbols.

After receiving the signal from the guard interval inserter 727, the digital to analog converter 729 converts the signal into an analog signal and outputs the analog signal to the RF processor 731. The RF processor 731 includes a filter and a front end unit and transmits the analog signal to a transmission antenna after RF-processing the analog signal for transmission.

Hereinafter, an internal structure of the transmission power allocator 722 as shown in FIG. 7 when frequency reuse factors of 1 and K are used will be described with reference to FIG. 8.

Figure 8:
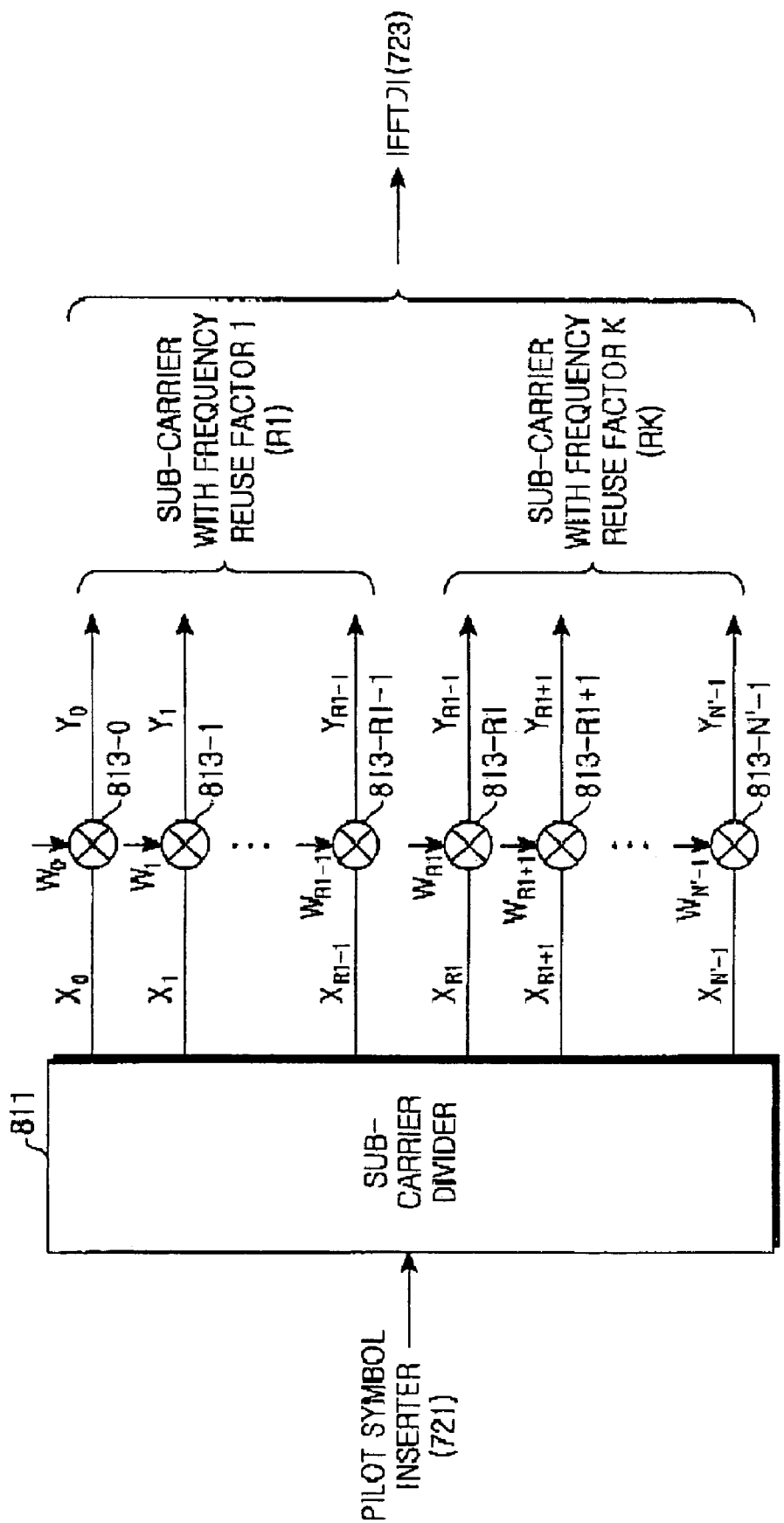
FIG. 8 is a schematic view illustrating an internal structure of a transmission power allocator as shown in FIG. 7 when frequency reuse factors of 1 and K are used.

FIG. 8 is a schematic view illustrating the internal structure of the transmission power allocator 722 as shown in FIG. 7 when frequency reuse factors of 1 and K are used.

In FIG. 8, it is assumed that the IEEE 802.16e communication system uses N sub-carriers with frequency reuse factors of 1 and K.

Referring to FIG. 8, the transmission power allocator 722 includes a sub-carrier divider 811 and a plurality of multipliers 813-0 to 813-N'-1. The signal output from the pilot symbol inserter 721 is input to the sub-carrier divider 811, so that the sub-carrier divider 811 divides the signal into two sub-carrier groups according to the frequency reuse factors. That is, the sub-carrier divider 811 divides the signal into a first group including sub-carriers with a frequency reuse factor of 1 and a second group including sub-carriers with a frequency reuse factor of K. The number of sub-carriers included in the first group is R1 and the number of sub-carriers included in the second group is RK. When the frequency reuse factor is K, each cell/sector may use 1/K sub-carriers from among resources having the frequency reuse factor K, so that R1, RK and N satisfy Equation (1):

$$RK = N - R1 \quad (1)$$

As mentioned above, since 1/K sub-carriers are used when the frequency reuse factor is K, R1 and RK satisfy Equation (2):

$$N' = R1 + RK \quad (2)$$

In Equation (2), N' is smaller than N.

A sub-carrier signal of two sub-carrier groups is defined as $X_n$, in which n represents a number of sub-carrier signal. If the frequency reuse factor is 1, n of the sub-carrier signal $X_n$ is in a range of about 0~R1−1. If the frequency reuse factor is K, n of the sub-carrier signal $X_n$ is in a range of about R1~(N'−1).

In addition, the signal outputted from the transmission power allocator 722 is obtained by multiplying the sub-carrier signal $X_n$ of the sub-carrier divider 811 by a predetermined weight $W_n$. Herein, the signal obtained by multiplying the sub-carrier signal $X_n$ by the predetermined weight $W_n$ is defined as $Y_n$.

$$Y_n = W_n \cdot X_n \quad (3)$$

In Equation (3), a subscript n of $W_n$ and $Y_n$ has a value identical to a value of a subscript n of $X_n$.

Although it is not illustrated in FIG. 8, the multipliers 813-0 to 813-N'−1 are connected to a controller. The controller determines the weight applied to the sub-channel signals and sends the weight to each of the multipliers 813-0 to 813-N'−1. In effect, the multipliers 813-0 to 813-N'−1 adjust transmission power of the sub-carrier signals output from the sub-carrier divider 811 by applying the weight to the sub-carrier signals.

In addition, the weight used for the sub-carrier signal with the frequency reuse factor 1 and the weight $W_n$ used for the sub-carrier signal with the frequency reuse factor K may satisfy Equation (4):

$$\sum_{n=0}^{N-1} W_n^2 = P \quad (4)$$

$$\frac{\left[\sum_{n=R1}^{N-1} W_n^2\right]/RK}{\left[\sum_{n=0}^{R1-1} W_n^2\right]/R1} = R_P$$

In Equation (4), P is a total transmission power of the IEEE 802.16e communication system, and $R_p$ is an average power ratio of sub-carriers having frequency reuse factors of K and 1. When $R_p$ is greater than 1, a part of transmission power to be allocated to the sub-carriers with the frequency reuse factor of 1 is additionally allocated to the sub-carriers with the frequency reuse factor of K.

Herein, mutually different weights are applied to the sub-carriers as shown in FIG. 8 for the purpose of transmission power application based on the frequency reuse factors of 1 and K, boosting of pilot sub-carriers, and transmission power application per each sub-carrier according to an Adaptive Modulation and Coding (AMC) scheme.

Hereinafter, an internal structure of the transmission power allocator 722 as shown in FIG. 7 when frequency reuse factors of 1 and 3 are used will be described with reference to FIG. 9 which is a schematic view illustrating such a structure.

Figure 9:
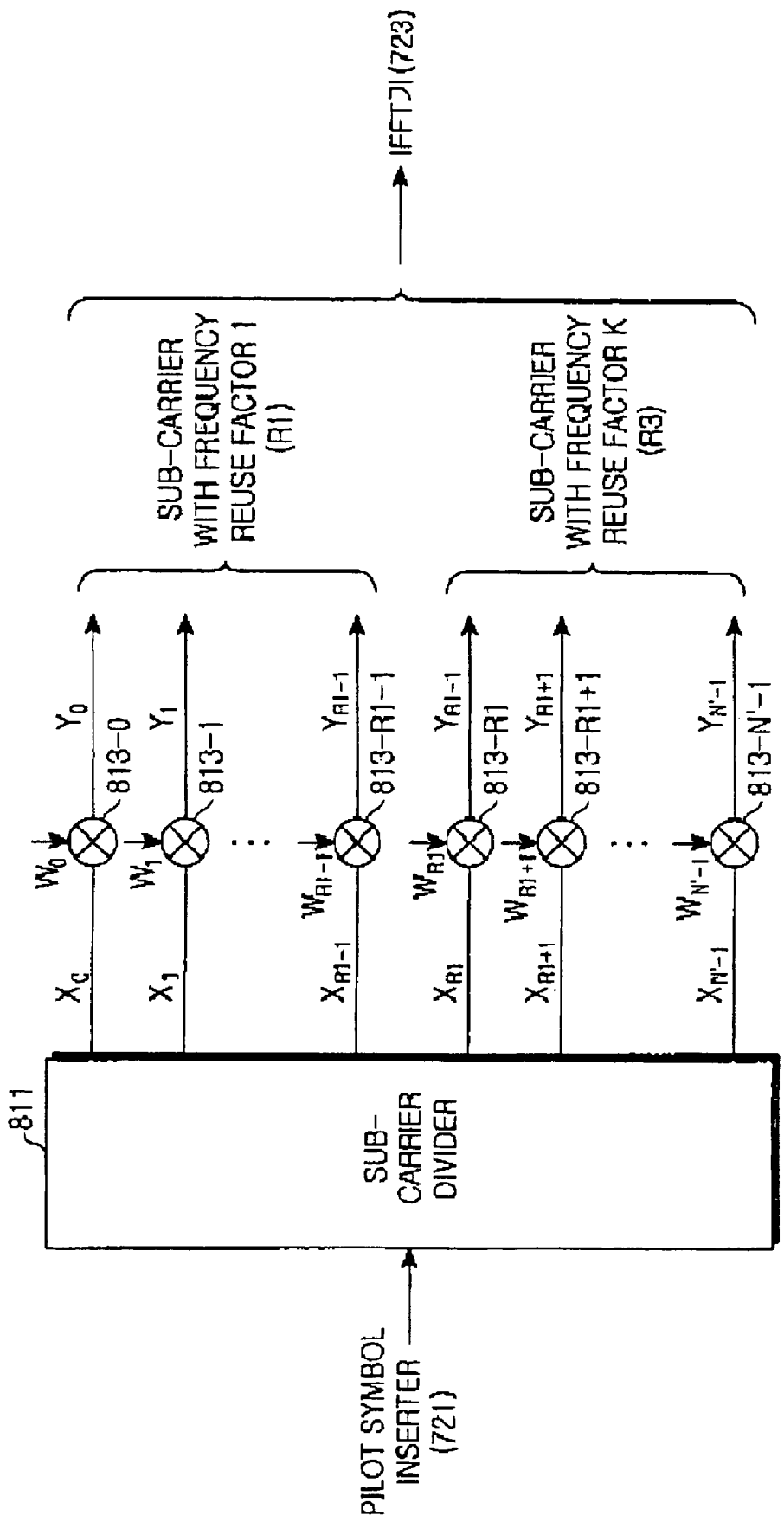
FIG. 9 is a schematic view illustrating an internal structure of a transmission power allocator as shown in FIG. 7 when frequency reuse factors of 1 and 3 are used.

In FIG. 9, it is assumed that the IEEE 802.16e communication system uses N sub-carriers with frequency reuse factors of 1 and 3. Although it will be described that the IEEE 802.16e communication system employs the frequency reuse factors of 1 and 3 for illustrative purpose, other frequency reuse factors are also applicable for the IEEE 802.16e communication system. Similar to the transmission power allocator 722 shown in FIG. 8, the transmission power allocator 722 shown in FIG. 9 includes a sub-carrier divider 811 and a plurality of multipliers 813-0 to 813-N'−1. However, the transmission power allocator 722 shown in FIG. 9 employs frequency reuse factors 1 and 3.

In particular, the transmission power allocator 722 shown in FIG. 9 allocates the transmission power corresponding to the frequency reuse factors to improve the Signal to Interference and Noise Ratio (SINR) of a sub-carrier signal with a frequency reuse factor 3 by S[dB]. The same weight is applied to the sub-carriers employing the same frequency reuse factor. That is, a weight $W_1$ is applied to the sub-carriers with the frequency reuse factor 1, and a weight $W_3$ is applied to the sub-carriers with the frequency reuse factor 3 as shown in Equation (5):

$$W_1 = W_n(n = 0 \sim R1-1)$$

$$W_3 = W_n(n = R1 \sim N'-1) \quad (5)$$

Since it is assumed that interference is rarely applied to the sub-carrier with the frequency reuse factor 3, the SINR of the sub-carrier with the frequency reuse factor 3 can be represented by Equation (6):

$$SINR3_n = \frac{W_3^2 \cdot PL_n^0 \cdot X_n^2}{\mu} \quad (6)$$

In Equation (6), the $SINR3_n$ is an SINR of an $n^{th}$ sub-carrier signal $X_n$ with the frequency reuse factor 3, $PL_n^0$ is a signal attenuation component (that is, a pass loss) between a transmitter and a receiver of a cell (that is, a serving BS), to which the $n^{th}$ sub-carrier signal $X_n$ is allocated in the IEEE 802.16e communication system, $\overline{X_n}^2$ is an average power of the $n^{th}$ sub-carrier signal $X_n$ and $\mu$ is an average power of noise components. As can be seen from Equation 6, when the frequency reuse factor 3 is employed, interference components from an adjacent BS do not exert an influence upon the $SINR3_n$ of the $n^{th}$ sub-carrier signal $X_n$.

When a present weight $W_3$ is 1 ($W_3=1$), a relationship between the weight $W_3$ ($W_3=1$) and a weight $W_1$ capable of improving the $SINR3_n$ by $S[dB]$ ($S \geqq 0$) is shown in Equation (7):

$$W_3 = 10^{(S/20)} \quad (7)$$

$$W_1 = \sqrt{\frac{P - W_3^2 \cdot R3}{R1}}$$

As can be seen from Equation (7), the SINR of the sub-carrier signal with the frequency reuse factor 3, that is, the $SINR3_n$, is improved by $S[dB]$. In addition, the SINR of the sub-carrier signal with the frequency reuse factor 1, that is, the $SINR1_n$, is not degraded, or, the $SINR1_n$ is degraded less than the improved $S[dB]$. Herein, the $SINR1_n$ is an SINR of the $n^{th}$ sub-carrier signal $X_n$ with the frequency reuse factor 1.

$$SINR1_n = \frac{W_1^2 \cdot PL_n^0 \cdot \overline{X_n^2}}{\mu + W_1^2 \cdot \sum_{i \neq 0} PL_n^i \cdot \overline{X_n^{i2}}} \quad (8)$$

In Equation (8), $PL_n^i$ is a signal attenuation component (that is, a pass loss) between a transmitter and a receiver of an $i^{th}$ neighbor BS of a cell, to which the $n^{th}$ sub-carrier signal $X_n$ is allocated in the IEEE 802.16e communication system, and $\overline{X_n^{i2}}$ is an average power of the sub-carrier signal $X_n$ of the $i^{th}$ neighbor BS. As can be seen from Equation (8), when the frequency reuse factor 1 is employed, all sub-carrier resources are simultaneously used in all BSs, so the noise component is significantly smaller than the interference component, making it possible to disregard the noise component. When the noise component is disregarded, the $SINR1_n$ is represented by Equation (9):

$$SINR1_n \cong \frac{W_1^2 \cdot PL_n^0 \cdot \overline{X_n^2}}{W_1^2 \cdot \sum_{i \neq 0} PL_n^i \cdot \overline{X_n^{i2}}} = \frac{PL_n^0 \cdot \overline{X_n^2}}{\sum_{i \neq 0} PL_n^i \cdot \overline{X_n^{i2}}} \quad (9)$$

As shown in Equation (9), the $SINR1_n$ is not influenced by variation of the weight $W_1$. In addition, intensity and interference/noise components of the signal may be lowered due to the weight $W_1$ even when the noise components are relatively large, so reduction of the $SINR1_n$ is less than the improvement $S[dB]$ of the $SINR3_n$. In particular, where $R1>R3$, that is, when the number of the sub-carriers with the frequency reuse factor 3 is smaller than the number of the sub-carriers with the frequency reuse factor 1, the reduction of $SINR1_n$ is further decreased.

Hereinafter, a procedure of allocating the transmission power according to an embodiment of the present invention will be described with reference to FIG. 10 which is a flowchart illustrating the procedure.

Figure 10:
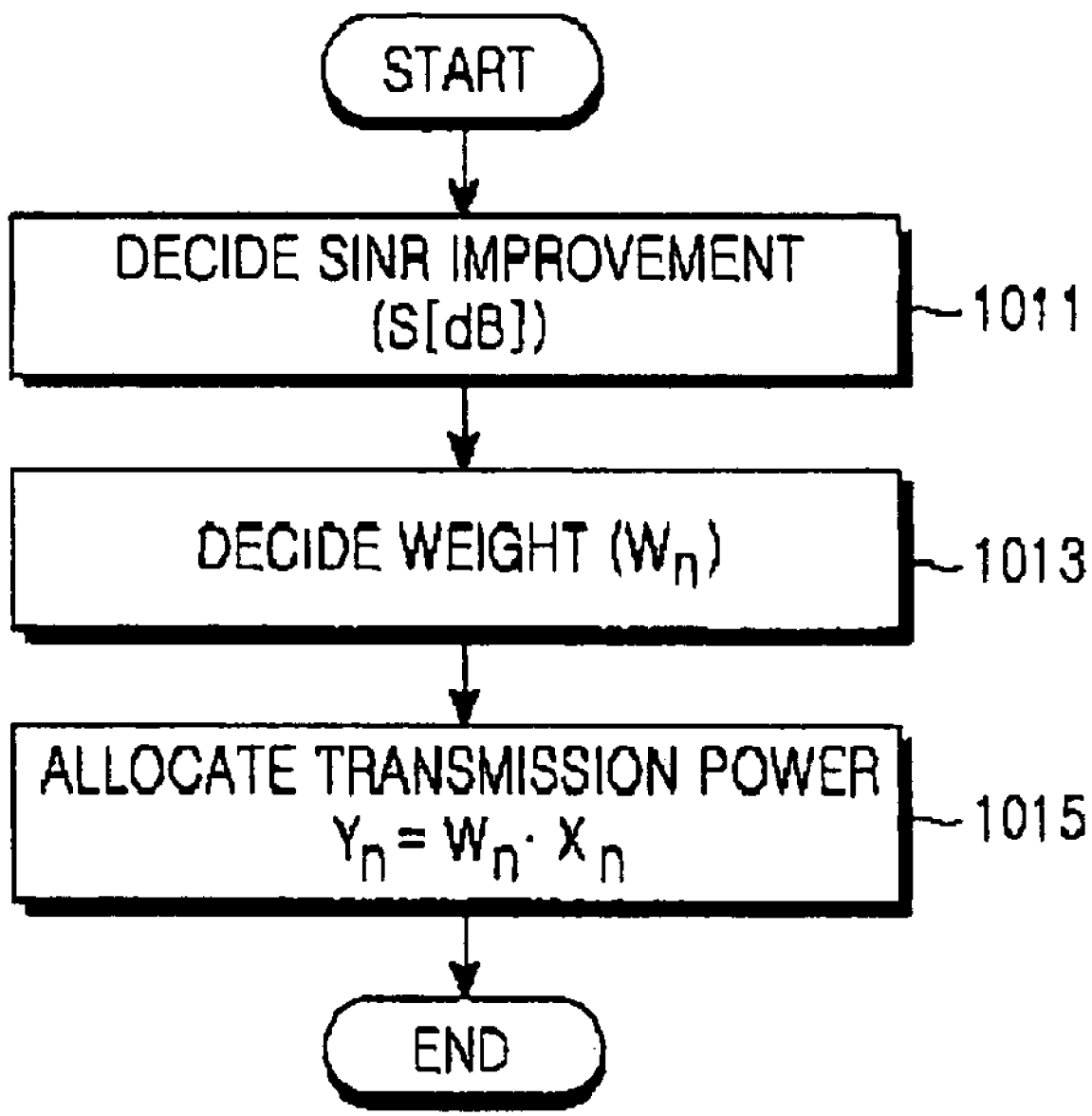
FIG. 10 is a flowchart illustrating a procedure of allocating transmission power according to an embodiment of the present invention.

In FIG. 10, it is assumed that the IEEE 802.16e communication system employs the frequency reuse factors of 1 and K. In step 1011, the transmitter of the OFDAM communication system decides an amount of $SINRK_n$ improvement in relation to the sub-carrier signal $X_n$ with the frequency reuse factor K. Herein, the amount of $SINRK_n$ improvement is defined as $S[dB]$. In step 1013, the transmitter decides the weight $W_n$ for each sub-carrier in such a manner that the weight $W_n$ satisfies the $S[dB]$ of the $SINRK_n$. Since the procedure of deciding the weight $W_n$ has already been described above, it will not be further described below. In step 1015, the transmitter applies the weight $W_n$ to the sub-carriers and transmits the sub-carriers to the receiver.

As described above, according to the present invention, the OFDMA communication system employs multiple frequency reuse factors to control transmission power allocation corresponding to the frequency reuse factors, thereby controlling the SINR according to the frequency reuse factors. That is, the weight applied to the sub-carriers with a higher frequency reuse factor is increased, thereby improving the SINR and transmission efficiency of the system.

While the present invention has been shown and described with reference to certain preferred embodiments thereof, it will be understood by those skilled in the art that various changes in form and details may be made therein without departing from the spirit and scope of the invention as defined by the appended claims.

What is claimed is:

1. A method to control transmission power in a communication system, the method comprising:

applying a first weight to sub-carrier signals employing a first frequency reuse factor, thereby controlling the transmission power; and applying a second weight to sub-carrier signals employing a second frequency reuse factor, thereby controlling the transmission power;

wherein the first weight and the second weight are determined corresponding to an improvement value of a Signal to Interference and Noise Ratio (SINR) of the sub-carrier signals employing the first frequency reuse factor to increase the SINR of the sub-carrier signals employing the first frequency reuse factor obtained in a previous time duration, and are determined using the improvement value of the SINR, a total transmission power of the communication system, a number of the sub-carriers employing the first frequency reuse factor in the communication system, and a number of the sub-carriers employing the second frequency reuse factor in the communication system.

2. The method as claimed in claim 1, wherein, when the first frequency reuse factor is K and the second frequency reuse factor is 1, the first weight and the second weight are determined according to:

$$W_K = 10^{(S/20)}$$

$$W_1 = \sqrt{\frac{P - W_K^2 \cdot RK}{R1}}$$

wherein, $W_K$ is the first weight, $W_1$ is the second weight, S is the improvement value of the SINR, P is the total transmission power of the communication system, R1 is the number of the sub-carriers employing the frequency reuse factor of 1 in the communication system, and RK is the number of the sub-carriers employing the frequency reuse factor of K in the communication system.

3. A method to control transmission power in a communication system, the method comprising:
applying a first weight to data sub-carrier signals employing a first frequency reuse factor, thereby controlling the transmission power;
applying a second weight to reference sub-carrier signals employing the first frequency reuse factor, thereby controlling the transmission power;
applying a third weight to data sub-carrier signals employing a second frequency reuse factor, thereby controlling the transmission power; and
applying a fourth weight to reference sub-carrier signals employing the second frequency reuse factor, thereby controlling the transmission power,
wherein the first weight, the second weight, the third weight and the fourth weight are determined corresponding to a target Signal to Interference and Noise Ratio (SINR) of the data sub-carrier signals employing the first frequency reuse factor, and the second weight is equal or greater than the first weight, and the fourth weight is equal or greater than the third weight.

4. An apparatus to control transmission power in a communication system, the apparatus comprising:
a transmission power allocator for applying a first weight to sub-carrier signals employing a first frequency reuse factor, thereby controlling the transmission power, and applying a second weight to sub-carrier signals employing a second frequency reuse factor, thereby controlling the transmission power;
wherein the first weight and the second weight are determined corresponding to a target Signal to Interference and Noise Ratio (SINR) of the sub-carrier signals employing the first frequency reuse factor; and
wherein the transmission power allocator comprises:
a sub-carrier divider to divide the sub-cater signals into the sub-carrier signals employing the first frequency reuse factor and the sub-carrier signals employing the second frequency reuse factor;
a controller to determine the target SINR and determining the first weight and the second weight corresponding to the target SINR; and
a plurality of multipliers to multiply the sub-carrier signals employing the first frequency reuse factor and the sub-carrier signals employing the frequency reuse factor by the first and second weights, a number of the multipliers corresponding to a number of the sub-carrier signals.

5. An apparatus to control transmission power in a communication system, the apparatus comprising:
a transmission power allocator to apply a first weight to sub-carrier signals employing a first frequency reuse factor, thereby controlling the transmission power, and apply second weight to sub-carrier signals employing a second frequency reuse factor, thereby controlling the transmission power,
wherein the first weight and the second weight are determined corresponding to an improvement value of a Signal to Interference and Noise Ratio (SINR) of the sub-carrier signals employing the first frequency reuse factor to increase the SINR of the sub-carrier signals employing the first frequency reuse factor obtained in a previous time duration, and are determined using the improvement value of the SINR, a total transmission power of the communication system, a number of the sub-carriers employing the first frequency reuse factor in the communication system, and a number of the sub-carriers employing the second frequency reuse factor in the communication system.

6. The apparatus as claimed in claim 5, wherein the transmission power allocator comprises:
a sub-carrier divider to divide the sub-carrier signals into the sub-carrier signals employing the first frequency reuse factor and the sub-carrier signals employing the second frequency reuse factor;
a controller to determine the first and second weights corresponding to the improvement value of the SINR, respectively; and
a plurality of multipliers to multiply the sub-carrier signals employing the first and second frequency reuse factors by the first and second weights, a number of the multipliers corresponding to a number of the sub-carrier signals.

7. The apparatus as claimed in claim 6, wherein when the first frequency reuse factor is K and the second frequency reuse factor is 1, the controller determines the first and the second weights according to:

$$W_K = 10^{(S/20)}$$

$$W_1 = \sqrt{\frac{P - W_K^2 \cdot RK}{R1}}$$

wherein, $W_K$ is the first weight, $W_1$ is the second weight, S is the improvement value of the SINR, P is the total transmission power of the communication system, R1 is the number of the sub-carriers employing the frequency reuse factor of 1 in the communication system, and RK is the number of the sub-carriers employing the frequency reuse factor of K in the communication system.

8. An apparatus to control transmission power in a communication system, the apparatus comprising:
a transmission power allocator for applying a first weight to data sub-carrier signals employing a first frequency reuse factor, thereby controlling the transmission power, applying a second weight to reference sub-carrier signals employing the first frequency reuse factor, thereby controlling the transmission power, applying a third weight to data sub-carrier signals employing a second frequency reuse factor, thereby controlling the transmission power, and applying a fourth weight to reference sub-carrier signals employing the second frequency reuse factor, thereby controlling the transmission power;
wherein the first weight, the second weight, the third weight and the fourth weight are determined corresponding to a target Signal to Interference and Noise Ratio (SINR) of the data sub-carrier signals employing the first frequency reuse factor; and
wherein the transmission power allocator comprises:
a sub-carrier divider to divide the sub-carrier signals into the sub-carrier signals employing the first frequency reuse factor of 1 and the sub-carrier signals employing the second frequency reuse factor of K;
a controller to determine the first and second weights corresponding to the target SINR, respectively; and
a plurality of multipliers to multiply the sub-carrier signals employing the first and second frequency reuse factors by the first and second weights, respectively, a number of the multipliers corresponding to a number of the sub-carrier signals.

9. The apparatus as claimed in claim 8, wherein the second weight is equal to or greater than the first weight, and the fourth weight is equal to or greater than the third weight.

* * * * *